March 16, 1954  F. LEVY-HAWES ET AL  2,672,178
METHOD AND MACHINE FOR MAKING POWDER PUFFS
Filed March 1, 1950  11 Sheets-Sheet 1

INVENTORS
FELIX LEVY-HAWES
MAURICE CASTEL
BY Mock & Blum
ATTORNEYS

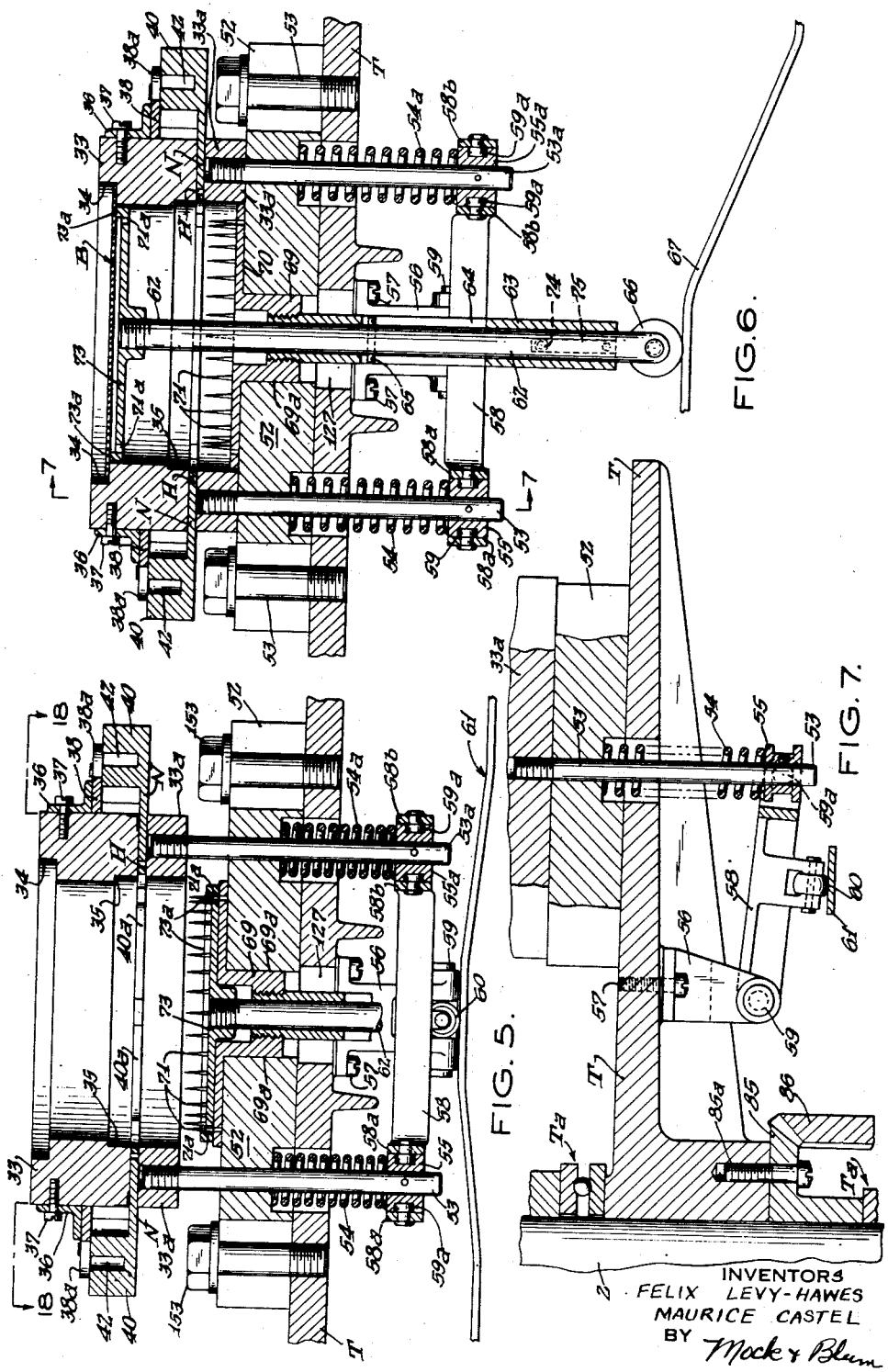

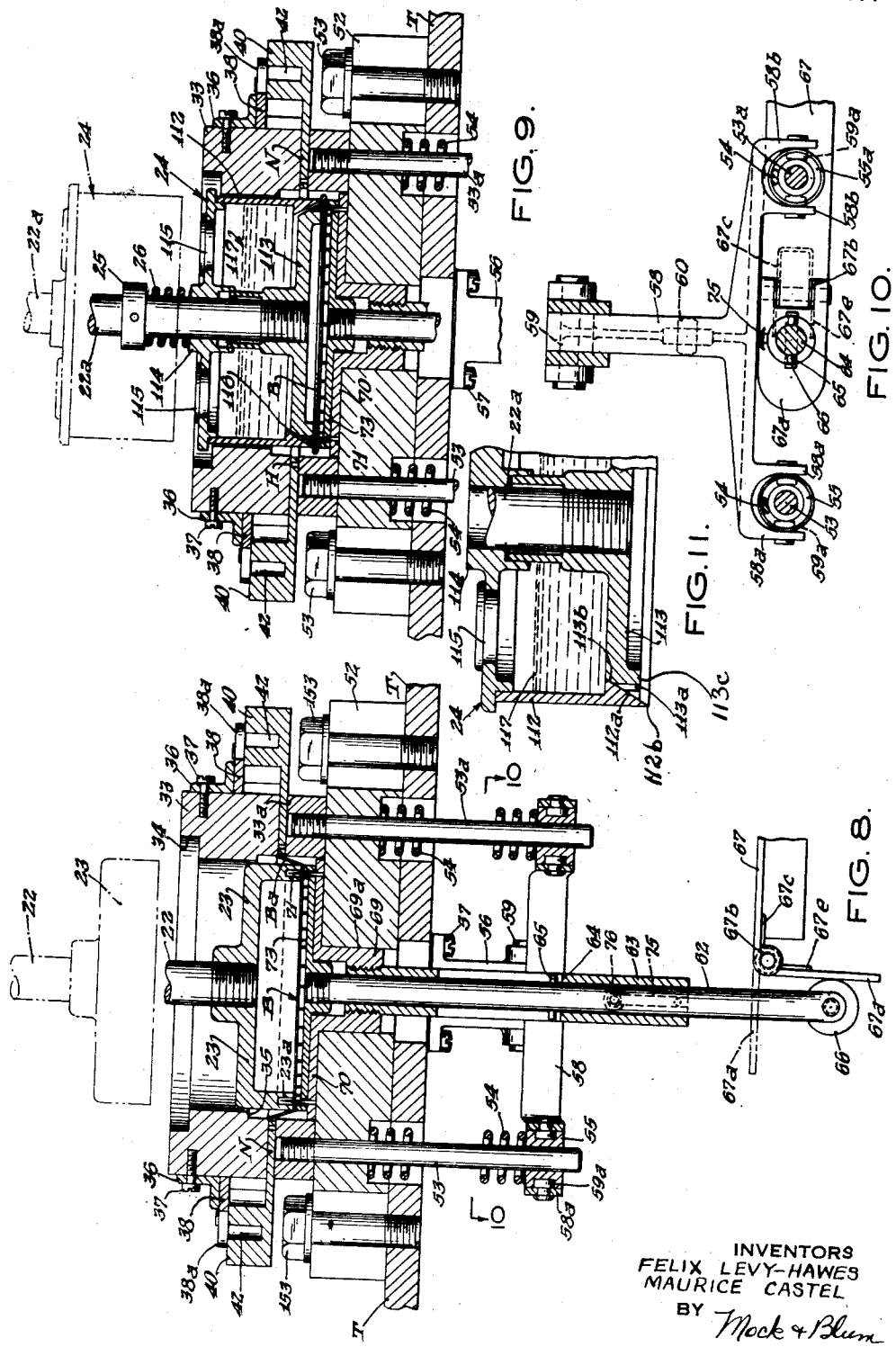

March 16, 1954     F. LEVY-HAWES ET AL     2,672,178
METHOD AND MACHINE FOR MAKING POWDER PUFFS
Filed March 1, 1950     11 Sheets-Sheet 5

INVENTORS
FELIX LEVY-HAWES
MAURICE CASTEL
BY Mock & Blum
ATTORNEYS

March 16, 1954  F. LEVY-HAWES ET AL  2,672,178
METHOD AND MACHINE FOR MAKING POWDER PUFFS
Filed March 1, 1950  11 Sheets-Sheet 7

INVENTORS
FELIX LEVY-HAWES
MAURICE CASTEL
BY
ATTORNEYS

March 16, 1954  F. LEVY-HAWES ET AL  2,672,178
METHOD AND MACHINE FOR MAKING POWDER PUFFS
Filed March 1, 1950  11 Sheets-Sheet 9

INVENTORS
FELIX LEVY-HAWES
MAURICE CASTEL
BY Mock & Blum
ATTORNEYS

March 16, 1954  F. LEVY-HAWES ET AL  2,672,178
METHOD AND MACHINE FOR MAKING POWDER PUFFS
Filed March 1, 1950  11 Sheets-Sheet 10
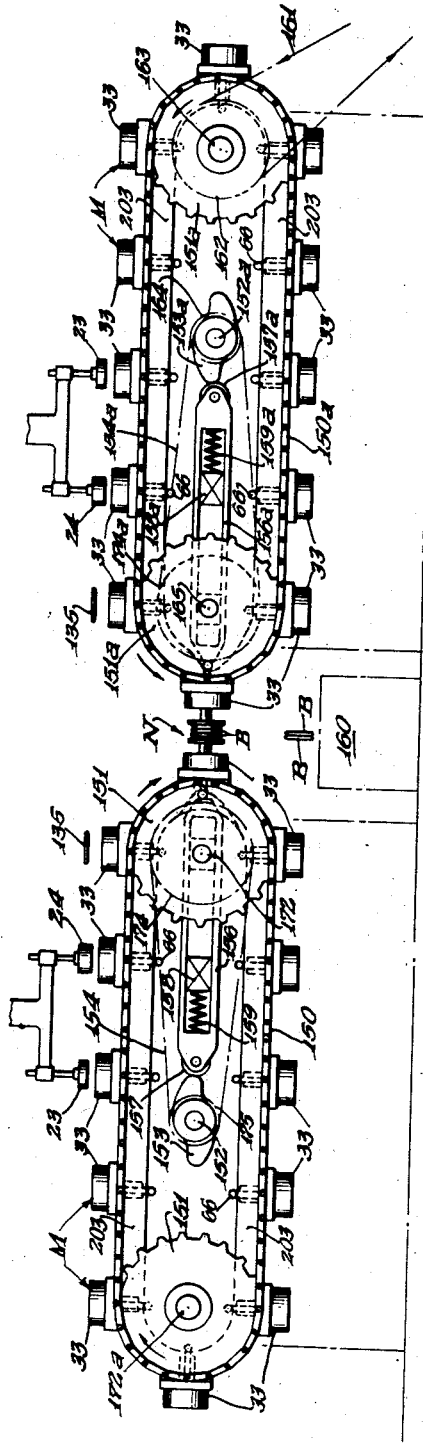
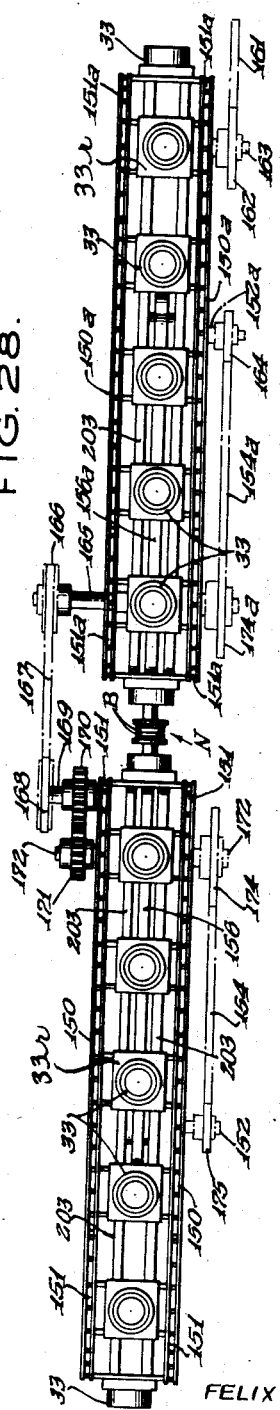
FIG. 28.
FIG. 29.
INVENTORS
FELIX LEVY-HAWES
MAURICE CASTEL
BY Mock & Blum
ATTORNEYS INVENTORS
FELIX LEVY-HAWES
MAURICE CASTEL
BY *Mock & Blum*
ATTORNEYS Patented Mar. 16, 1954

2,672,178

UNITED STATES PATENT OFFICE 2,672,178

METHOD AND MACHINE FOR MAKING POWDER PUFFS

Felix Levy-Hawes, Rye, and Maurice Castel, Freeport, N. Y., assignors to Hygienol Company, Inc., New Rochelle, N. Y., a corporation of New York Application March 1, 1950, Serial No. 147,012

16 Claims. (Cl. 154—1.8)

This invention relates to a new and improved powder puff, a new and improved method of making a powder puff, and new and improved mechanism for making a powder puff.

It is well-known to make a powder puff which has one or more parts which are made of pile material, with the fibers of the pile material exposed.

The invention is explained with reference to the manufacture of a powder puff which has two identical body members made of pile material, with an intermediate inner layer of filler, although the invention is not limited to this embodiment.

Although various machines and methods of manufacture have been proposed, hand work is still used in the manufacture of such powder puffs. In such hand manufacture, the two body members are substantially wholly sewed to each other, either with or without an intermediate layer of filler material, while the pile surfaces of the body members face each other. The partly finished puff is then turned inside out at its unsewed portion, thus exposing the pile fibers. The gap in the turned puff is then finished by handsewing. This hand work is expensive, and the resultant finished puffs are of irregular quality.

According to this invention, a superior machine and method are provided, and superior puffs are produced.

Other objects and advantages and features of this invention are disclosed in the annexed description and drawings which disclose preferred embodiments of the invention.

Fig. 5 is a section on the line 5—5 of Fig. 1;

Fig. 6 is a section on the line 6—6 of Fig. 1;

Fig. 7 is a section on the line 7—7 of Fig. 6;

Fig. 8 is a section on the line 8—8 of Fig. 1;

Fig. 9 is a section on the line 9—9 of Fig. 1, showing the adhesive-applying means in an open position;

Fig. 10 is a section on the line 10—10 of Fig. 8;

Fig. 11 is an enlarged detail sectional view, showing the closed position of the glue adhesive-applying devices, said glue adhesive-applying devices being shown in the open position of Fig. 9;

Fig. 28 is a side elevation of a second embodiment, in which the parts are mounted on two endless conveyors. In this embodiment, the assembly operation of Fig. 23 is performed automatically;

Fig. 29 is a top plan view of Fig. 28;

TURNTABLE T

Figure 4:
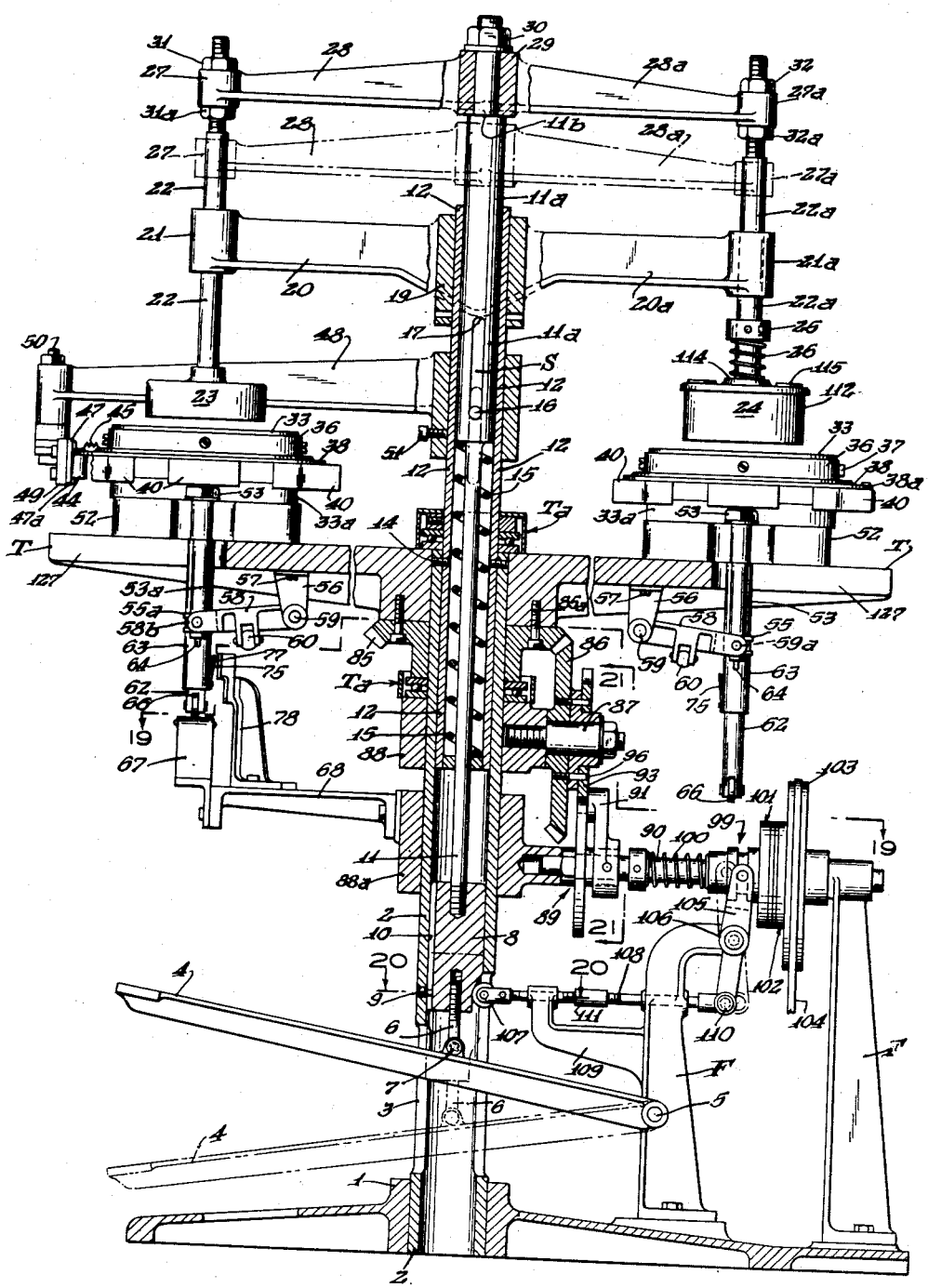
Fig. 4 is a section on the line 4—4 of Fig. 1.

As shown for example in Fig. 4, the machine has a frame F which includes a base 1, to which a hollow, vertical, cylindrical post 2 is fixed. The turntable T is turnable about the vertical axis of post 2. A part of the upper face of turntable T abuts the turnable member of an upper antifriction end-thrust bearing Ta, whose housing is fixed to post 2. A bevel gear 85 is fixed to the lower face of turntable T by fastening members 85a. The bottom edge-wall of the hub of bevel gear 85 abuts the upper turnable member of a lower end-thrust, antifriction bearings Ta, which is supported on a collar 88, which is fixed to post 2.

Bevel gear 85 meshes with bevel gear 86, which is turnable on stud-shaft 87, whose inner threaded end is fixed to the collar 88.

As also shown in Fig. 4, bevel gear 86 is fixed by fastening members 96 to the driven disc or star wheel 93 of a conventional Geneva movement 89.

Figure 21:
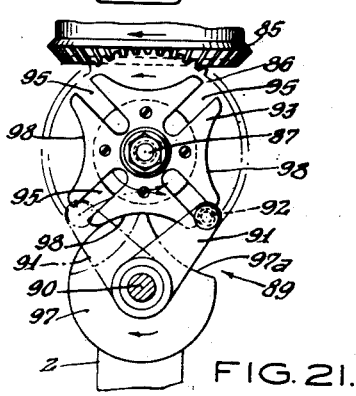
Fig. 21 is a section on the line 21—21 of Fig. 4.

As shown in Fig. 21, said driven disc 93 has four radial recesses 95, which divide the driven disc 93 into four sections, each of which has a concave face 98.

Arm 91, which is fixed to shaft 90, has a turnable roll 92, which meshes successively with the successive recesses 95.

When arm 91 is turned clockwise from its broken-line to its full-line position of Fig. 21, its roll 92 meshes with a respective recess 95 and then moves out of said recess 95, and the driven disc 93 is turned through an angle of 90° in a counterclockwise direction as viewed in Fig. 21.

The cam wheel 97, which has a recess 97a, is fixed to shaft 90. The cylindrical face of cam wheel 97 meshes with a respective concave face 98, to lock the star wheel 93 temporarily, during the period in which the roll 92 is out of mesh with the star wheel 93. Since the parts of a Geneva intermittent movement are conventional, no further explanation is required. Shaft 90 is supported in a respective collar 98a which is fixed to post 2.

As shown in Fig. 4, a grooved collar 99 is mounted slidably and non-turnably on the turnable shaft 90. A friction disc 101 is fixed to collar 99. The shaft of a pulley 103 is turnably mounted in frame F. Said pulley 103 is driven by a belt 104, and said pulley 103 has a friction disc 102 fixed thereto.

A compression spring 100, mounted on shaft 90, normally engages friction disc 101 with friction disc 102, to provide a releasable driving clutch 101—102 which is normally coupled. Arm 105, pivoted at 106 to frame F, has a roll which extends into the groove of collar 99. The lower end of clutch-arm 105 is connected by pivot pin 110 to a two-section rod 108, which is horizontally slidable in a bearing of frame F. The length of rod 108 is adjustable. For this purpose, its two sections are adjustably connected by collar 111. Said rod 108 also extends slidably through a bearing of the frame-arm 109.

The inner end of arm 108 has a roll 107. In Fig. 4, said roll 107 abuts the lower cam-shaped end of a slide S, which is vertically slidable in post 2. Said slide S has a vertical slot 10, and a key 9, which is fixed to post 2, extends into slot 10, so that slide S cannot turn relative to post 2. A pin 6 is fixed to the lower end of slide S. The lower end of pin 6 is connected by a pivot pin 7 to a treadle 4, which is turnably connected by pivot pin 5 to frame F.

The normal position of treadle 4 is its full-line position of Fig. 4. The pivot 5 may be provided with a torsion spring to maintain treadle 4 in said normal position.

When the foot of the operator depresses treadle 4 from its full-line position to its broken-line position of Fig. 4, the rod 108 is moved to the right by the lower cam-shaped end of slide S from the full-line position of rod 108 which is shown in Fig. 4 to the broken-line position of rod 108 in Fig. 4, thus turning arm 105 from its full-line position to its broken-line position of Fig. 4, thus uncoupling the clutch 101—102. As later described, the operator thus depresses treadle 4 when the turntable T is temporarily locked by the Geneva movement. The uncoupling of the clutch 101—102 provides further safety against an accidental turning movement of turntable T.

OUTER DIES 33

Figure 1:
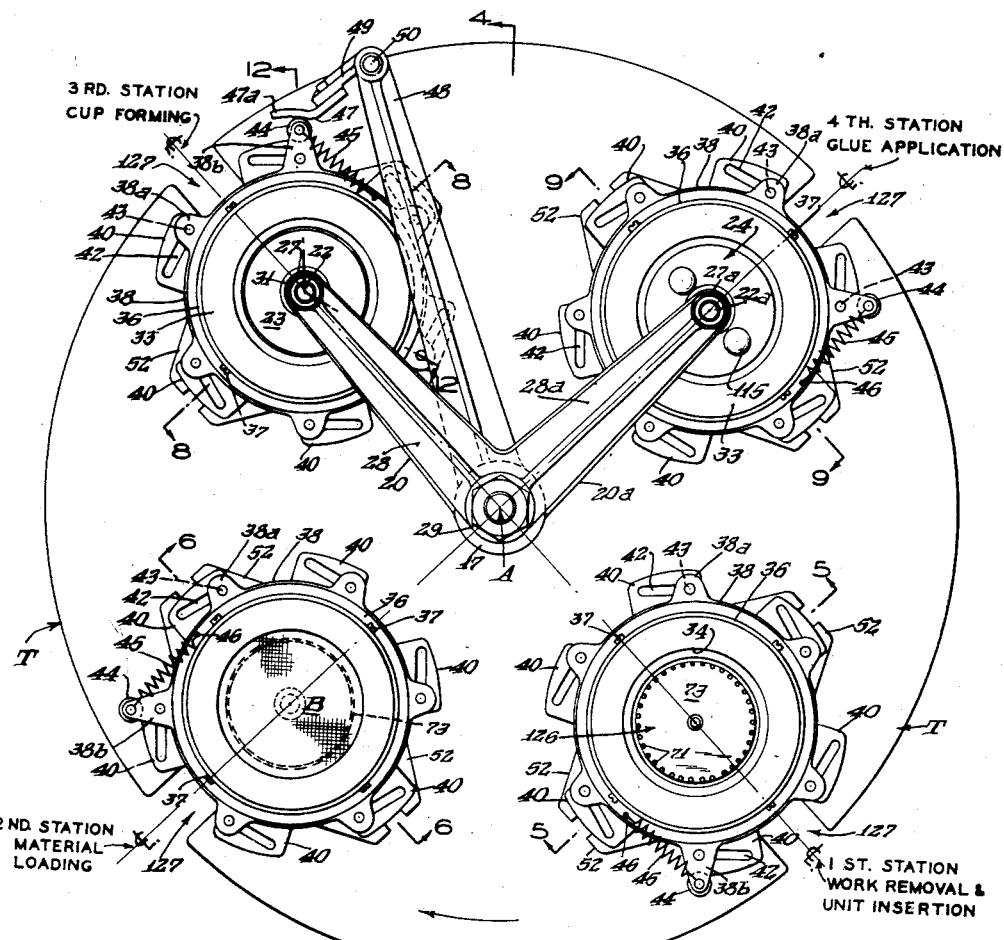
Fig. 1 is a top plan view of one embodiment of the improved machine.

This embodiment has four identical outer dies 33, which are shown at the respective stations in Fig. 1.

Figures 12, 13, 14, 15, 16:
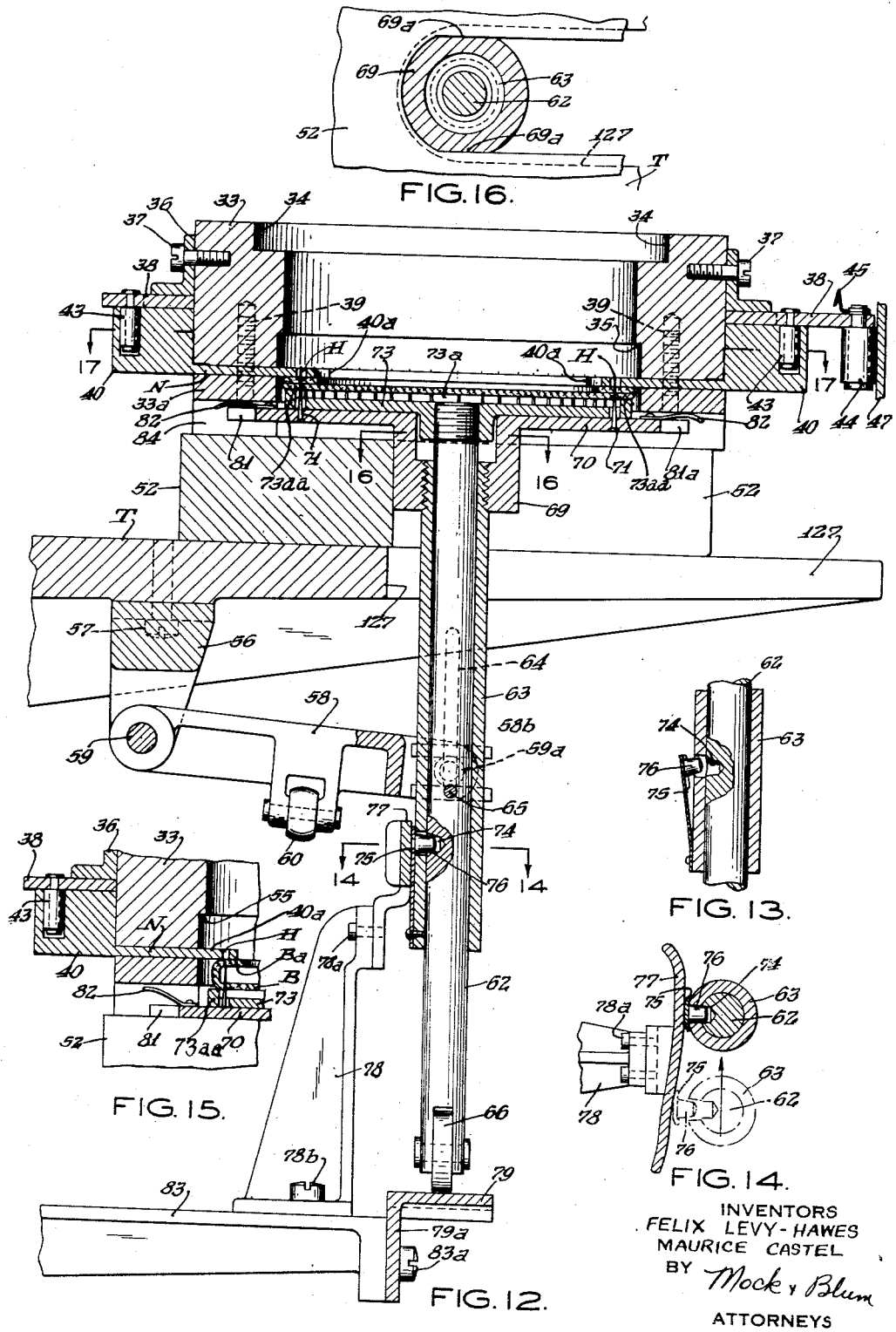
Fig. 12 is a section on the line 12—12 of Fig. 1.
Fig. 13 is a detail vertical section, showing the latch of the needle unit, said latch being shown in the open position in Fig. 12.
Fig. 14 is a section on the line 14—14 of Fig. 12.
Fig. 15 is a detail sectional view, showing the needle plate in its "down" position, said needle plate being shown in its "up" positoin in Fig. 12.
Fig. 16 is a section on the line 16—16 of Fig. 12.

These outer dies 33 are shown in detail in Figs. 5, 6 and 12, together with their identical associated parts.

As shown in Fig. 12, each die 33 has a top recess 34, which provides an internal shoulder. Fig. 6 shows how the operator initially inserts a cylindrical blank B of pile fabric into recess 34, so that said blank B rests upon said shoulder. The pile face of blank B is its bottom face in Fig. 6.

Fig. 8 shows that each outer die 33 has a bottom recess 35.

Fig. 12 shows that an outer, angular plate 36 is fixed to each outer die 33 by fastening members 37.

The bottom horizontal flange of each plate 36 is close to or abuts a plate 38. The plate 38 can turn freely relative to plate 36 and the respective outer die 33, around the vertical axis of the respective outer die 33.

Figure 18:
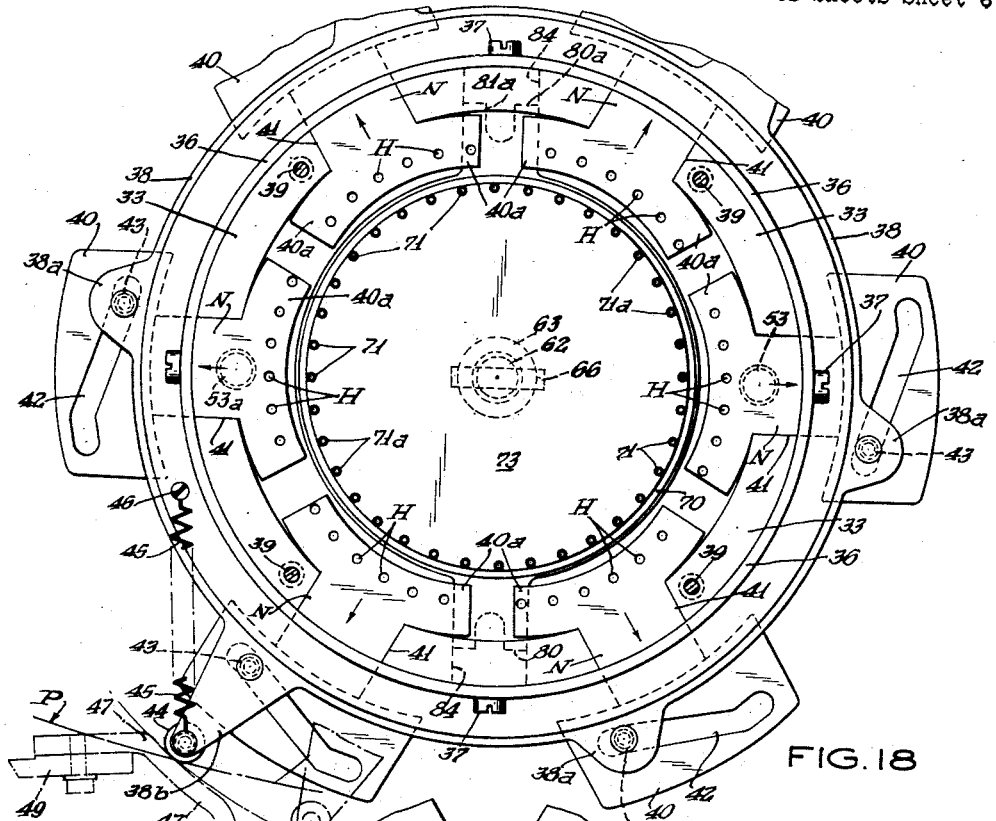
Fig. 18 is a section on the line 18—18 of Fig. 5.

Fig. 18 shows that each plate 38 has five radial and horizontal lugs 38a of equal length, and a sixth radial lug 38b which is longer than the lugs 38a. As also shown in Fig. 18, the long lug 38b has a roller or cam-member 44, which is turnable relative to its lug 38b around a vertical axis. The ends of a tension spring 45 are respectively connected to the long lug 38b and to the horizontal flange of the angular plate 36.

An additional roll or cam-member 43 is turnably connected to the long lug 38b to turn around a vertical axis, and each of the short lugs 38a has a similar roll 43.

Figs. 12 and 18 show that each outer die 33 is provided with six radially slidable plates 40. Each said plate 40 has a cam-slot or cam-member 42, in which a respective cam-roll 43 is located. Each plate 40 has a reduced neck N of rectangular shape, which fits slidably in a respective radial slot of a guide ring 33a, which is fixed to the bottom of die 33 by screws 39. Each plate 40 has an enlarged head 40a, which extends into the bottom recess 35 of the respective die 33. Said heads 40a have holes H, through which the impaling needles 71, later described herein, can pass.

Figure 17:
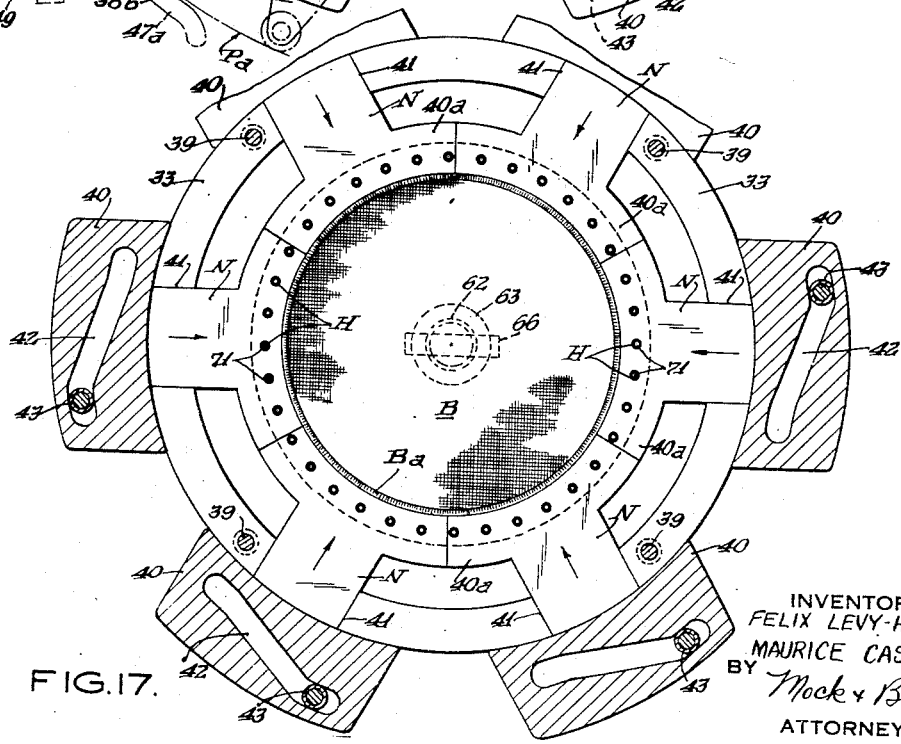
Fig. 17 is a section on the line 17—17 of Fig. 12.

When said heads 40a are in their inner positions of Fig. 17, the radial edges of heads 40a abut each other, so that the inner circumferential faces of heads 40a form a closed ring.

As shown for example in Fig. 5, each guide-ring 33a is fixed to a pair of vertical rods 53 and 53a, which extend through respective vertical bores of turntable T and of a respective block 52. These blocks 52 are fixed to turntable T by screws or bolts 153. Hence the outer dies 33 turn in unison with turntable T and said dies 33 are vertically movable relative to turntable T.

Each die 33 is biased to its bottom position of Fig. 6, in which the respective guide ring 33a abuts the respective block 52, by means of compression springs 54 and 54a.

These springs 54 and 54a extend through respective bores of turntable T into respective recesses of the respective block 52. The bottom ends of compression springs 54 and 54a abut respective grooved collars 55 and 55a which are fixed respectively to rods 53 and 53a.

Fig. 7 shows that a lug 56 is fixed adjacent each die 33 to the bottom face of turntable T, by means of a screw or screws 57. An arm 58 is turnably connected to each lug 56 by a pivot pin 59. Each arm 58 has forked extensions 58a and 58b, which have rolls 59a which engage the grooves of the respective collars 55 and 55a. Each arm 58 has a roll 60.

Figure 19:
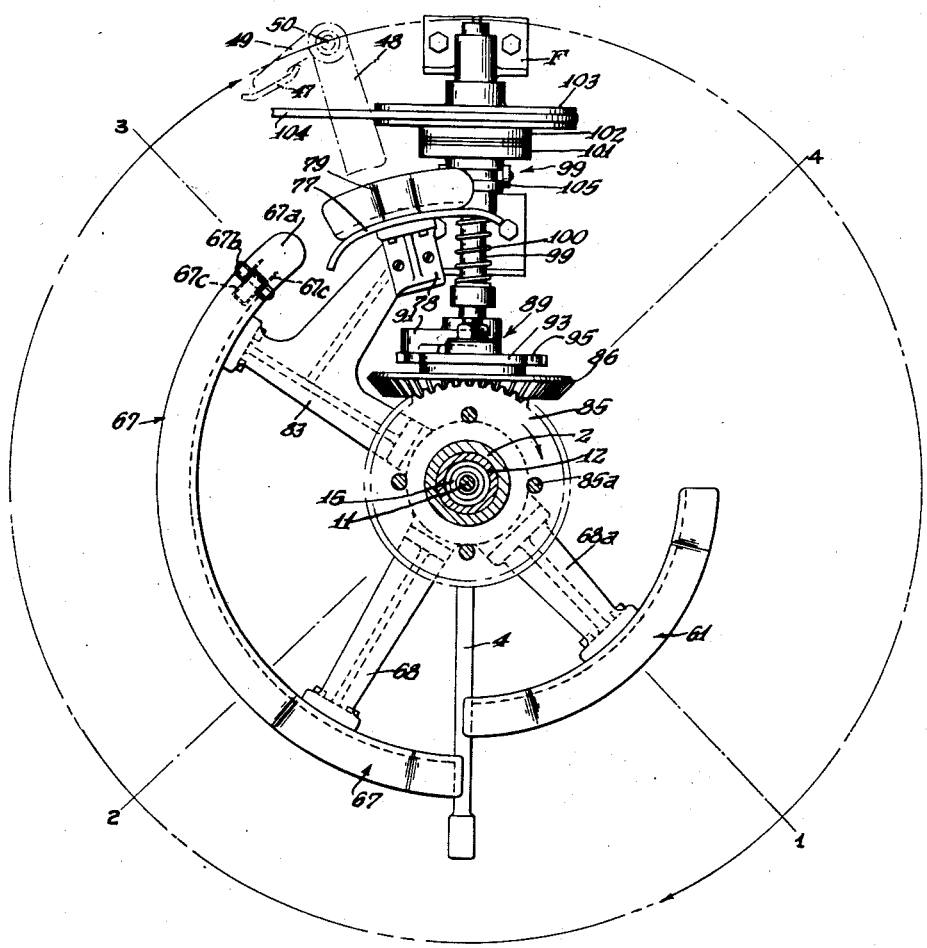
Fig. 19 is a section on the line 19—19 of Fig. 4.
Figure 20:
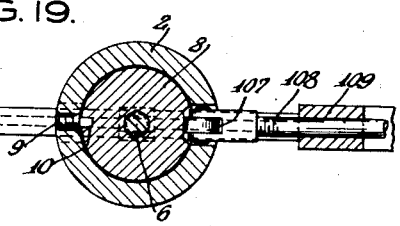
Fig. 20 is a section on the line 20—20 of Fig. 4.
Figure 22:
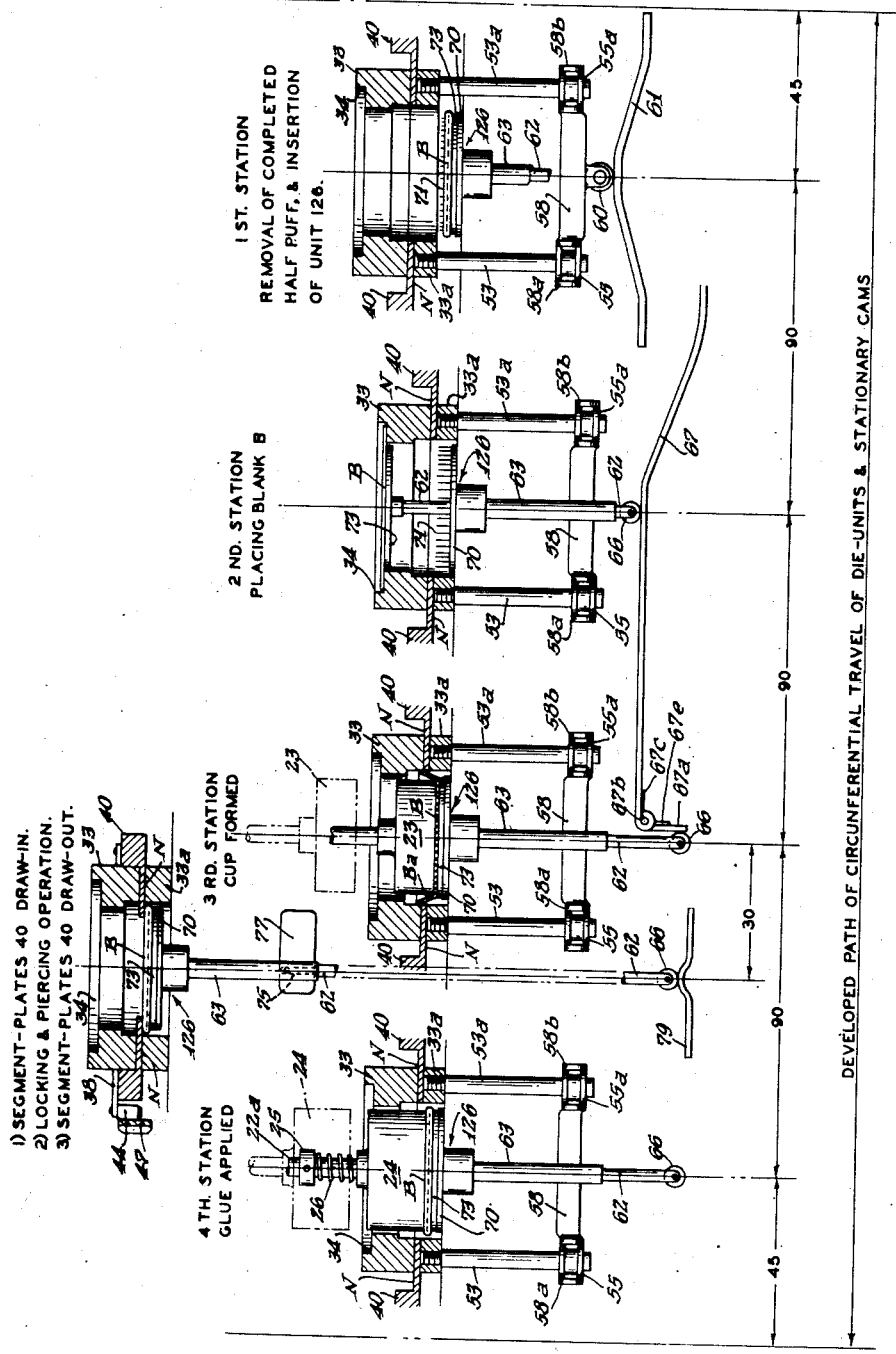
Fig. 22 is a schematic view which shows the sequence of operations.

Figs. 7, 19 and 22 show a cam 61, which is fixed to an arm 68a which is fixed to collar 88a of post 2.

Fig. 22 shows that cam 61 has a raised part at the first station.

Each die 33 is thus maintained in its normal lower position of Fig. 4 and Fig. 6 at the second, third, and fourth stations, and each die 33 is maintained temporarily elevated relative to turntable T in its upper position of Fig. 5 at the first station.

While the turntable T is held stationary, a cup-die 23 is lowered at the third station from its top broken-line position of Fig. 8 to its lower full-line position shown in Fig. 8, thus moving blank B from its position of Fig. 6 to its position of Fig. 8. As shown in Fig. 8, the flat body of the blank B is then impaled upon a circular row of needles 71, and an initial frusto-conical rim Ba is formed in blank B. At this stage, the needles 71 clear said rim Ba. The cup-die 23 has a bottom recess 23a, which the needles 71 enter when the cup-die 23 is moved to its bottom position.

Fig. 1 shows an angular cam 47a—47, whose leg 47 is fixed to arm 49, which is adjustably connected by the pivot clamping screw 50 to an arm 48, which is fixed to a collar which is fixed by clamping screw 5 to sleeve 12 which is fixed to post 2. The angular relation between arms 49 and 48 can thus be adjusted. The arm 49 may be an extension of leg 47.

When a respective die 33 is at the first, second and third stations, the respective tension spring 45 maintains the respective plates 40 in their normal outer positions of Fig. 18. Said normal outer positions of plates 40 are also shown in Figs. 5 and 6.

When a respective die 33 at the third station is moved towards the fourth station, the respective roll 44 strikes the left leg 47a of cam or cam-member 47a—47 or rides along said left leg 47a towards the peak of said cam 47a—47, thus turning the respective ring-shaped plate 38 counterclockwise relative to its die 33, and thus moving the respective six plates 40 inwardly from their normal outer positions of Fig. 18 to their shifted inner positions of Fig. 17, in which the side edges of heads 40a abut each other, and the interior circumferential edges of heads 40 form a closed ring. The effect of such inward movement of the plates 40 is shown in Fig. 15, which shows that the original frusto-conical bead Ba of Fig. 8 is curled inwardly, and that the holes H of the heads 40a are thus vertically alined with the needles 71. The plates 40 are maintained in their inner positions of Fig. 17 during a suitable period of the movement of the respective die 33 from the third station to the fourth station, as later described.

CUP-DIE 23

The machine has a single cup-die 23, which cooperates with a respective lower die 33 at the third station.

As shown in Fig. 4, said cup-die 23 is fixed to the lower end of a rod 22, which is vertically slidable in a bearing 21 of an arm 20 which is fixed to collar 19, which is fixed to the fixed sleeve 12, which is fixed to post 2 by fastening members 14.

As also shown in Fig. 4, a rod 11 is fixed to slide 8. Said rod 11 extends through the perforation in the bottom transverse wall of fixed sleeve 12, and said rod 11 is fixed to an enlarged head 11a, which fits slidably in sleeve 12. Said rod 11a has a top reduced pin 11b, which extends through the hub 29 of a pair of vertically movable arms 28 and 28a, which are fixed to the upper threaded end of pin 11b by a nut 30.

Rod 22 has an upper threaded end which extends through a sleeve 27 of arm 28. Nuts 31 and 31a fix rod 22 to arm 28.

The head 11a of rod 11 has a vertical slot S, which has an upper end 17. A stop pin 16, which is fixed to sleeve 12, extends through slot S.

When treadle 4 is in its normal full-line position of Fig. 4, the compression spring 15 maintains head 11a and arms 28 and 28a in their top full-line positions of Fig. 4, with the stop pin 16 abutting the lower end of slot S. The cup-die 23 is then in its upper position of Fig. 4. This upper position of cup-die 23 is also shown in broken lines in Fig. 8.

When treadle 4 is turned down to its broken-line position of Fig. 4, rod 11 and its head 11a and its pin 11b and arm 28 are moved down, as illustrated by the bottom broken-line position of arm 28 in Fig. 4, and the cup-die 23 is moved to its lower full-line position of Fig. 8, thus moving the blank B from its position of Fig. 6 to its position of Fig. 8, and impaling the body of blank B upon the needles 71 of the respective needle unit 126, and forming the initial frusto-conical rim Ba.

NEEDLE UNITS 126

Figure 2:
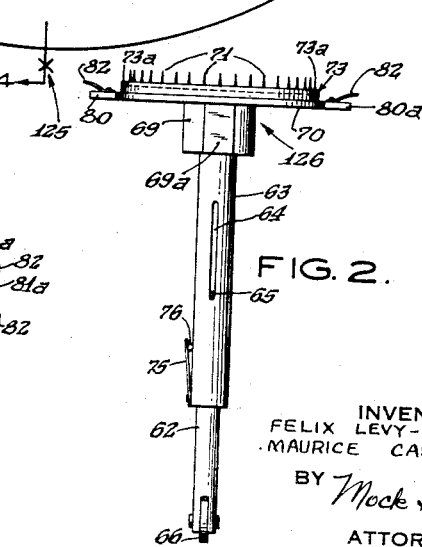
Fig. 2 is a vertical elevation of one of the needle units which are inserted into the machine and which are removed from the machine.

As shown in Figs. 2 and 12, each needle unit 126 comprises a sleeve or tube 63, in which a rod 62 is slidable. The bottom end of rod 62 has a roll 65. Sleeve 63 has a vertical slot 64. Rod 62 has a pin 65 which extends through slot 64, so that rod 62 has a limited axial movement relative to sleeve 63, and rod 62 cannot turn relative to sleeve 63.

As also shown in Fig. 12, the upper end-part of sleeve or tube 63 is externally threaded and is fixed to a head 69, which is integral with a needle plate 70, to which a circular row of vertical needles 71 is fixed. These needles 71 are of small diameter so that the holes which are formed in the material by said needles 71 are substantially invisible in the finished product.

The upper end-part of rod 62 is threaded and fixed to a stripper plate 73, which has holes 71a through which the needles 71 can extend.

As shown in Figs. 12, 13 and 14, rod 62 has a lateral or horizontal recess 74, which is alined with a bore of sleeve 63 in Fig. 12. The lower end of a blade spring 75 is fixed to sleeve 63. A latch head 76 is fixed to the upper end of blade spring 75. When the latch head 76 is located in recess 74, as illustrated in Fig. 12, the rod 62 is in its bottom position relative to sleeve 63, and the stripper plate 73 abuts the needle plate 70.

In its normal position shown in Fig. 13, the latch head 76 clears recess 74, so that rod 62 is normally free to move upwardly relative to sleeve 63, to the upper position shown in Fig. 6.

Fig. 19 shows a horizontal cam 79 and a vertical cam 77, which are located between the third and fourth stations. As shown in Fig. 12, vertical cam 77 is fixed to arm 78, which is fixed to arm 83 by fastening members 78b, and a flange 79a of cam 79 is fixed to arm 83 by fastening members 83a. The inner end of arm 83 is fixed to post 2.

Fig. 19 shows another horizontal cam 67, which extends from a point between the first and second stations up to a point anterior the third station. Said cam 67 is fixed to arms 83 and 68, and arm 68, as shown in Fig. 4, is fixed to a collar 88a, which is fixed to post 2. The arm 83 may also be rigidly fixed to this collar 88a.

As shown in Figs. 8 and 19, the fixed cam 67 has a plate-extension 67a located below the third station. This plate extension 67 is pivoted at 67b to the cam 67. A torsion spring 67c—67e normally maintains the plate-extension 67a in its upper broken-line position of Fig. 8.

When a needle unit 126 is inserted at the first station, the rod 62 of said inserted needle unit 126 is in its bottom position of Fig. 2 relative to its sleeve 63.

As shown in Fig. 22, the rod 62 is moved by cam 67 to its top position relative to sleeve 63 between the first and second stations, and said rod 62 is maintained in said relative top position at the third station, so that the raised annular flange 73a of the stripper plate 73 is maintained in its position of Fig. 6 at the second station, and also at the third station while the cup-die 23 is in its top position. Hence the pin 65 is at the top of slot 64 at the third station, before the cup-die 23 is depressed at the third station.

When the cup-die 23 is depressed at the third station, the stripper plate 73 is depressed below its position of Fig. 6 together with rod 62, and the plate-extension 67a is temporarily turned to its vertical position shown in Fig. 22, while the sleeve 63 remains supported from the block 52 by means of the needle plate 70.

Referring to Fig. 19, and while the plates 40 of the die 33 which is being moved from the third station to the fourth station are in their inner positions of Fig. 17, the blade spring 75 of the respective latch contacts with the vertical cam 77, thus latching the respective rod 62 to its sleeve 63, while said rod 62 is in its bottom position relative to its sleeve 63.

While thus latched, the respective roll 66 is moved to the raised part of cam 79 which is shown in Fig. 22, thus moving the respective needle plate 70 and its abutting stripper plate 73 above the respective block 52, from the positions shown in Fig. 15 to the positions shown in Fig. 12. The inwardly bent rim Ba and the edge-part of the flat body of the blank B are thus pressed against each other as shown in Fig. 12, and the needles 71 are pushed through the holes H of heads 40a of plates 40.

The roll 66 then moves off the raised part of the cam 79.

The springs 82 then force the latched needle unit downwardly, until the bottom face of needle plate 70 again abuts the top of the block 52.

The needles 71 are thus withdrawn from the holes H. Due to the pressure which has been applied to rim Ba, and the frictional grip of needles 71 upon rim Ba, said rim Ba is maintained in the shape shown in Fig. 12.

Figure 3:
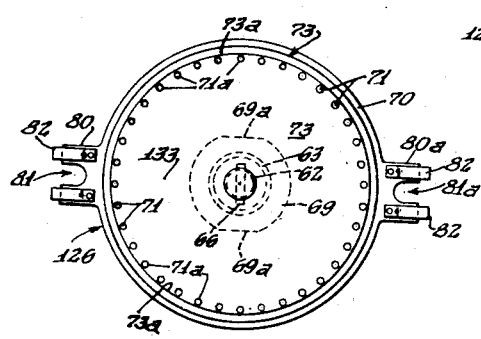
Fig. 3 is a top plan view of Fig. 2.

As shown in Fig. 3, each needle plate 70 has a pair of lugs 80 and 80a, which have respective intermediate recesses 81 and 81a. One end of a blade spring 82 is fixed to the upper face of each lug 80 and 80a. In the bottom position of needle plate 70 which is shown in Fig. 15, said blade springs 82 may abut the bottom face of the guide ring 33a, which is fixed to die 33 and which serves as an abutment for the free ends of springs 82, so that said springs 82 normally maintain the needle plate 70 in its position of Fig. 15.

The guide ring 33a is provided with recesses 84 in which the lugs 80 and 80a are located.

After the needles 71 have been thus released from the holes H, the cam 47a—47 releases the roll 44, so that the tension spring 45 restores the plates to their normal outer positions, before the die 33 arrives at the fourth station.

The respective needle unit 126 is unlatched after the roll 66 moves off the raised part of cam 79. As shown in Fig. 19, the part of cam 77 which is concentric with the axis of rotation of turntable T, and which keeps the head 76 in its latching position, is located anterior to and after the raised part of cam 79.

The cam 47a—47 releases the roll 44, so that spring 45 restores the plates 40 to their outer positions of Fig. 18, at any time after the needles 71 have been withdrawn from holes H. Optionally and preferably, the cam 47a—47 thus releases the roll 44, after the head 69 has been released from rod 62.

GLUE-APPLYING MECHANISM 24

Any type of glue or adhesive 117 may be used, such as a latex adhesive which dries and sets to vulcanized form at ordinary room temperature of 20° C.–25° C.

Fig. 9 shows a tank for holding the adhesive 117 and which consists of two parts which are vertically movable relative to each other, namely, a vertical ring 112 and a bottom wall 113.

Fig. 11 shows said tank in closed condition, in which the frusto-conical edge-wall 112a of ring 112 makes sealing contact with a frusto-conical edge wall 113b of bottom wall 113.

A cover 114, which has filling openings 115, is held to ring 112.

The bottom wall 113 has holes 113a for receiving the needles 71. Said bottom wall 113 is fixed to rod 22a, which is slidable relative to cover 114.

As shown in Fig. 4, said rod 22a is vertically slidable in a bearing 21a of an arm 20a, which is fixed to the fixed collar 19 of the fixed sleeve 12.

The upper threaded end of rod 22a is fixed to arm 28a, which is fixed to the collar or hub 29, by means of nuts 32 and 32a. The rod 22a is thus raised and lowered in unison with rod 22 by treadle 4. Fig. 4 also shows a collar 25 which is fixed to rod 22a, and a compression spring 26 which holds cover 114 in position on ring 112, when rod 22a is moved vertically.

When the bottom wall 113 is in its bottom position of Fig. 9, the annular lip 113c of its cup-shaped bottom face exerts downward pressure upon the rim Ba and the corresponding portion of the body of blank B, and there is a ring-shaped opening 116 between ring 112 and bottom wall 113, through which the adhesive 117 passes to be deposited in a circular line on the top face of rim Ba, inwardly of the doubled edge of the blank B.

When rod 22a is raised to its upper position of Fig. 4, the entire adhesive-applying mechanism 24 is raised out of the respective outer die 33. Since spring 26 always biases the cover 114 to move downwardly relative to rod 22, said spring 26 also always biases ring 112 to move downwardly relative to bottom wall 113, so that the tank is biased to its closed position of Fig. 11, and no adhesive 117 can flow out of the adhesive-applying mechanism 24 when it is out of the respective die 33.

When the adhesive-applying mechanism is depressed, the bottom edge 112b of ring 112 first strikes the rim Ba above the flange or lip 73a of stripper plate 73, thus clamping said rim Ba between rim 112b and flange 73a. The downward movement of ring 112 is thus stopped. The bottom wall 113 is then moved slightly downwardly relative to ring 112, until the lip or flange 113c is located inwardly and close to lip 73a and said lip or flange strikes the respective part of rim Ba, thus providing the frusto-conical outlet 116, through which the adhesive 117 flows, while the needles 71 enter the openings 113a.

When rod 22a is raised from its final bottom position of Fig. 9, the bottom wall 113 is moved to its sealing position of Fig. 11 before ring 112 is raised, and ring 112 and bottom wall 113 are then raised in unison to their top positions of Fig. 4.

OPERATION OF MACHINE

As viewed in Fig. 1, the turntable T is turned intermittently in the clockwise direction. The position of the operator is at point 125.

A loaded needle unit 126 is defined as one which carries a blank B which has been shaped as shown in Fig. 9, and to which adhesive has been applied at the top face of the rim Ba.

While the parts are located as shown in Fig. 1, the operator depresses treadle 4. The respective outer die 33 at the first station is held in its elevated position of Figs. 5 and 22 by cam 81. While turntable T is held stationary, the operator slides the respective loaded needle unit 126 out of the machine at the first station. This is made possible by the respective radial recess 127. Also, and as shown in Fig. 12, each block 52 has a corresponding radial recess. The operator also inserts an unloaded needle unit 126 into proper position relative to the respective outer die 33 at the first station. At this first station, the heads 40a of the respective outer die 33 are in their open or separated positions of Fig. 18. The loaded needle unit 126 which is thus removed at the first station, has its rod 62 in its lower position relative to sleeve 63, with pin 65 at the bottom of slot 64, and with rod 62 unlatched from sleeve 63. The stripper plate 73 of the loaded needle unit 126 thus abuts needle plate 70, and the needle 71 keep the blank B in the shape to which it has been pressed as shown in Fig. 9.

It is impossible to remove or insert or to radially shift a needle unit 126 unless the respective outer die 33 is elevated. As shown in Figs. 8 and 9, the needle plate 70 fits closely in the respective guide ring 33a, when the respective die 33 is in its lower position.

At the second station, the cam 67 holds the respective rod 62, which is there unlatched from the respective sleeve 63, in the top position of rod 62 relative to sleeve 63, with pin 65 at or close to the upper end of slot 64. Hence the operator can place a new flat disc-shaped blank B in the position of Fig. 6, while treadle 4 is kept in its lower position.

At the third station, the rod 62 of the respective needle unit 126 is not latched to its sleeve 63. The lowering of treadle 4 actuates the single cup-die 23 at the third station to shape the blank B at the third station as shown in Fig. 6, and to lower the adhesive-applying mechanism at the fourth station as shown in Fig. 9.

The operator then releases the treadle 4, which moves to its upper position, and the turntable T is given its next intermittent movement.

During this intermittent movement, the roll 66 of the needle unit 126 which was located at the second station at the beginning of said intermittent movement, will move off the fixed cam 67 to its turnable cam-extension 67a, so that the next downward movement of the single cup-die 23 at the third station can depress the stripper plate 73 of the respective needle unit 126 at said third station, to abut the respective needle plate 70.

During said intermittent movement, there is a sequence of operations at the third station and between the third and fourth stations, as follows:

(a) Cam 47—47a turns the respective plate 38 counterclockwise relative to the respective die 33, thus moving heads 40a from their open or separated positions of Fig. 18, inwardly to their closed positions of Fig. 17, thus bending the rim Ba inwardly and alining holes H with needles 71. In Fig. 18, the line Pa indicates the movement of roll 44 and line P indicates the action of cam 47—47a.

(b) The cam 77 temporarily latches the respective rod 62 to the respective sleeve 63, while said rod 62 is in its bottom position relative to its sleeve 63, as shown in Fig 12, and the raised part of cam 79 raises the rod 62 and its temporarily latched sleeve 63 to the position shown in Fig. 12, thus forcing the needles 71 through the inwardly bent rim Ba and through the holes H of the heads 40a and the lip 73a presses the doubled edge-portion of the rim Ba against the bottom faces of the inwardly moved and abutting heads 40a, so that the entire inner face of rim Ba abuts the upper face of the flat body of blank B.

(c) During said intermittent movement, the rod 62 of the needle unit 126 which is moved from the third station to the fourth station, is unlatched from its sleeve 63. Also, the roll 66 of said respective needle unit 126 moves off the raised part of cam 79, and the springs 82 downwardly force the needle plate 70, so that the needles 71 are withdrawn from holes H. Needle plate 70 again abuts the top of the respective block 52, and the tension spring 45 returns the heads 40a to their normal outer and separated positions of Fig. 18.

Figure 23:
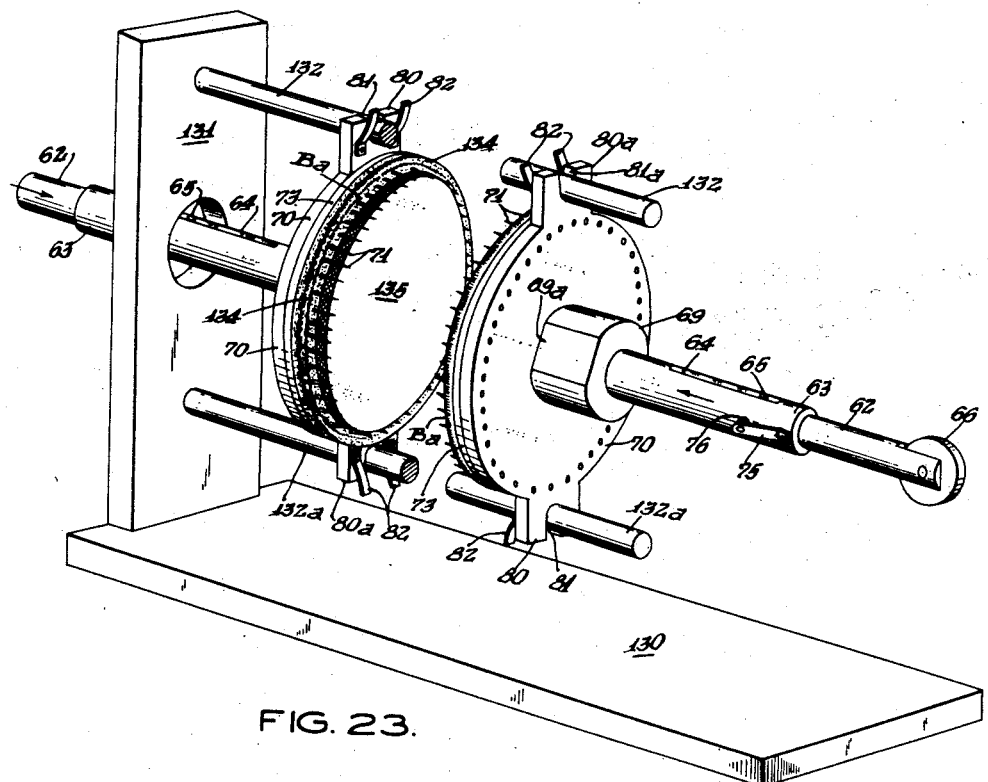
Fig. 23 illustrates hand-operated apparatus for bringing the two halves of the puff together.

At the fourth station, the adhesive-applying mechanism operates as previously described to deposit a thin ring of adhesive 134 which is shown in Fig. 23. This adhesive may be applied by hand, using a suitable tool.

Also, any of the cam-controlled operations illustrated herein may be performed by hand.

ASSEMBLY OF THE TWO HALVES OF THE BODY OF THE PUFF

In this embodiment, the puff consists of two equal body-parts with an intermediate filler 135.

Fig. 23 shows a fixture which has a horizontal base 130, a vertical plate 131 fixed to base 130, and horizontal and superposed rods 132 and 132a which are fixed to plate 131.

One of the loaded units 126 is mounted on rods 132 and 132a, with its sleeve 63 and its rod 62 extending through a horizontal opening of plate 131. Another loaded unit is similarly mounted on rods 132 and 132a, with the respective rims Ba facing each other.

The median line of the alined recesses 81 and 81a clears the needles 71.

Hence, when two loaded needle units 126 are assembled as shown in Fig. 23, the needles 71 of the respective units are not alined.

Fig. 23 shows one of the thin circular layers of adhesive 134. A single disc-shaped layer 135 of filler material is placed by the operator within and abutting one of the circular rows of needles 71.

When the two loaded units 126 of Fig. 23 are moved towards each other, the needles 71 of each unit pierce the blank of the other unit, and the two blanks are held pressed against each other until they are permanently connected by the contacting layers of adhesive 134.

Figures 24, 25:
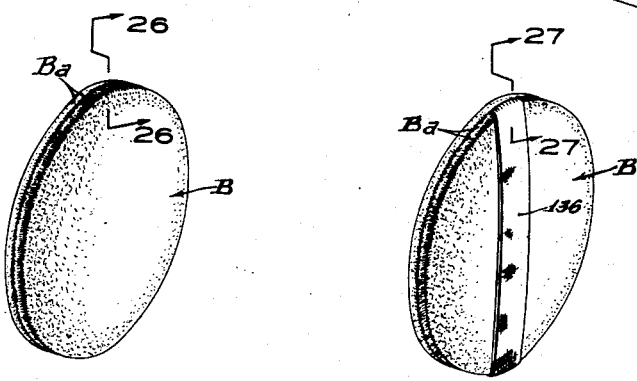
Fig. 24 illustrates a finished puff.
Fig. 25 shows a modified form of the finished puff, provided with a ribbon.

The units 126 are then moved away from each other and the finished puff shown in Figs. 24 and 25 is removed from the pins 71 by the respective stripper plate 73.

Fig. 23 also shows one of the planar face-portions 69a of the head 69. Each head 69 has two radially opposed flat face-portions 69a, in order to guide the respective needle unit 126 in its radial sliding movement in the respective recess 127 of the turntable and the respective recess of the respective block 52. When a needle unit 126 is thus inserted, said flat face-portions 69a prevent the needle unit 126 from turning around its vertical axis.

Figures 26, 27:
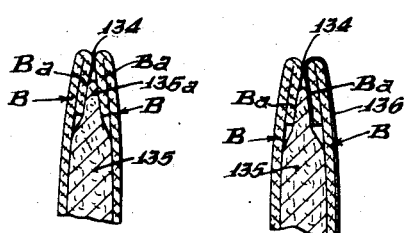
Fig. 26 is a section on the line 26—26 of Fig. 24.
Fig. 27 is a section on the line 27—27 of Fig. 25.

As shown in Fig. 26, the filler 135 of the finished puff has a compressed and tapered edge-portion 135a which is located between the inner portions of the inwardly bent rims Ba. The rim of edge-portion 135a is spaced inwardly from the binding-layers 134 of the set adhesive. The adhesive 134 is preferably spaced inwardly from the doubled edges of the rims Ba and from the inner edges of said rims Ba. The filler 135 is thus firmly held in position, and its edge-portion 135a is held compressed and clamped between the rims Ba. A very flexible puff and a resilient puff is thus produced.

Fig. 25 shows a ribbon 136, whose edges are bent inwardly. The edge-portions of ribbon 136 are located between the rims Ba. The edge-portions of the blank of rim 136 can be bent inwardly, and said edge-portions of the blank of ribbon 136 and the corresponding end-portions of the body of said blank are impaled upon radially opposed needles 71 of one of the needle units 126 in Fig. 23, before said needle units are slid towards each other to apply the necessary pressure to complete the puff and to shape the filler 135 as shown in Fig. 26.

Such pressure is initially applied to the parts of the puff by the lips 73a of the units 126, in order to apply high pressure at the adhesive 134 and the required pressure is then applied over the entire area of the puff.

The raised flanges 73aa of the stripper plates 73 are advantageous in the assembly operation, because said flanges 73aa can apply the assembly pressure, without danger of contact between the needles 71 of one unit 126 and the needle plate 70 of the other unit 126.

The needles 71 may optionally, but not necessarily, be sufficiently close to each other, so that when the final assembly pressure is applied, the edge of the filler 135 cannot pass between the needles.

Figs. 5 and 6 show that each outer die 33 is provided with a bottom recess 35 which is of greater internal diameter than the adjacent upper part of the inner wall of the die. This is optional because the die may be of uniform internal diameter up to the shoulder which is provided by the inner end of recess 34. This has the additional advantage of making it possible to push the needle plate 70 up to the upper end of the die 33 and even out of the die 33, in unison with the stripper plate 73. If desired, the lip or flange 73a of the stripper plate 73 may be made of material which has a high coefficient of friction and the bottom face of the cup die 23 may also be made of similar material, thus providing a firm grip of the blank B between the stripper plate 73 and the cup die 23, in performing the operation shown in Fig. 8.

Although we have illustrated a puff which has two body-members, each of which has an inwardly bent edge-portion, the invention applies to a puff which has only one such body-member. As is well-known, the other body-member may be a flat piece of material, which does not have an inwardly bent edge.

Also, the invention includes puffs of various shapes, in addition to the circular or disc shape illustrated herein. In such case, the original blank or blanks may be square, rectangular, triangular, or any other shape.

Also, while the invention relates particularly to a powder puff, the method and mechanism illustrated herein are useful for other purposes, so that the invention is not limited to a powder puff or to a method or mechanism for making a powder puff.

The Geneva stop movement may be replaced by any other mechanism for moving the turntable T or other carrier intermittently and the turntable T is only one illustration of a carrier or carriage for the parts.

While cams and other means have been provided to secure certain movements automatically, all the movements may be performed by hand.

It is within the scope of the invention to apply adhesive directly to only one of the body-portions of the puff or other article, because the contact of the body-portions under pressure will thus apply adhesive to both said body-portions.

EMBODIMENT OF FIGS. 28–32

The primary purpose of Figs. 28–32 is to illustrate a device which eliminates the manual operations which are required to assemble the two halves of the puff and to strip the finished puff from the needles, in using the apparatus of Fig. 23.

Hence many of the parts illustrated in Figs. 1–27 are not shown in Figs. 28–32. Also, and as previously stated, one or more of the cam-controlled operations can be performed by hand in the second embodiment, and the adhesive may be applied by hand in the second embodiment.

The second embodiment comprises respective conveyor means or units 150 and 150a, each of which consists of two parallel endless conveyors which are laterally alined. Said conveyor means have horizontal straight and longitudinally alined top runs and bottom runs. Said conveyor means 150 and 150a are illustrated as endless chains which mesh with and are carried by respective pairs of sprockets 151 and 151a. Sprockets 151 are fixed to respective lateral shafts 172a and 172 which are turnably mounted in the frame of the machine. Sprockets 151a are fixed to respective lateral shafts 165 and 163, which are turnably mounted in the frame of the machine. An additional drive sprocket 162 is fixed to shaft 163. An endless drive chain 161 meshes with drive sprocket 162. Said drive chain 161 is connected to a suitable intermittent drive mechanism, not shown, which actuates shaft 163 intermittently in equal intermittent angular movements, and which holds shaft 163 stationary in the intervals between said intermittent angular movements. The conveyor means 150 are thus intermittently actuated in strokes of equal length, and they are held stationary between said strokes.

A lateral shaft 169, which is turnably mounted in the frame of the machine, is provided between the proximate shafts 172 and 165.

An endless chain 167 meshes with sprockets 168 and 166, which are respectively fixed to shafts 169 and 165. A gear 170, which is fixed to shaft 169, meshes with an equal gear 171 which is fixed to shaft 172. The conveyor means 150 are thus also intermittently driven in strokes of equal length, in unison with conveyor means 150a. The actuating strokes of conveyor means 150 are of the same length as the actuating strokes of conveyor means 150a. The respective runs of conveyor means 150 and 150a are actuated in opposite directions.

Blocks 33r, which correspond to blocks 52 of the first embodiment, are located between and are fixed to the pair of chains of each conveyor means 150 and 150a. These blocks 33r are equally longitudinally spaced.

The chains of each conveyor means 150 and 150a are slidable upon the outer edges of respective bars 203. The inner edges of these bars 203 have respective edge-cams 203a, and their vertical faces have respective face-cams 202.

A needle unit, which is substantially the same as the needle unit 126 of the first embodiment, is permanently associated with each block 33r and its respective outer die 33.

Figure 33:
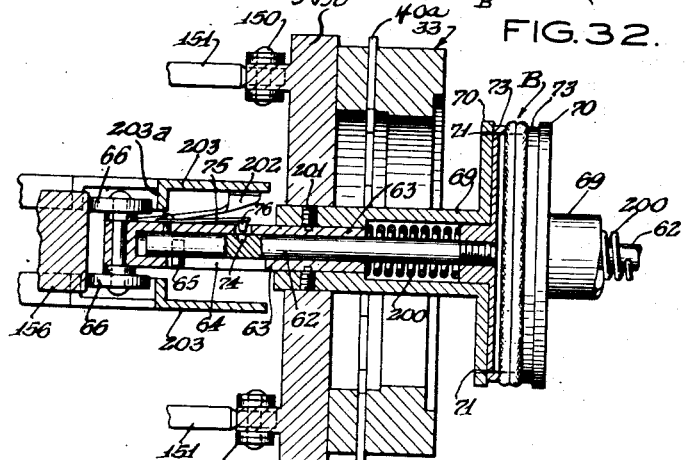
Fig. 33 is a section on the line 33—33 of Fig. 30.

As shown in Fig. 33, the cylindrical head 69 of each needle plate 70 is slidable in the respective block 33r, in the direction of the axis of said cylindrical head 69. Said cylindrical head 69 is non-turnable relative to block 33r. In this embodiment, the outer dies 33 are fixed to their respective blocks 33r.

Figure 32:
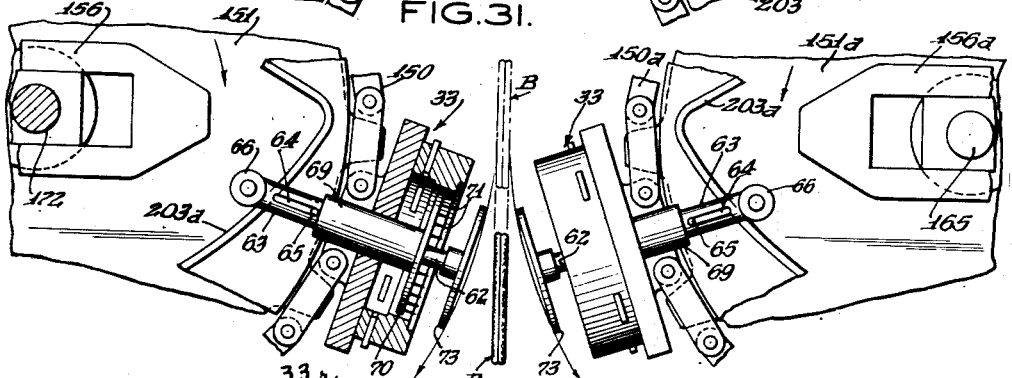
Fig. 32 illustrates the parts of Fig. 31, with the slide rods moved further inwardly or away from each other, thus stripping the finished puff from the needles.

As shown in Fig. 32, the head 69 of each needle plate 70 is fixed to the respective sleeve 63 by clamping screws 201. Each rod 62 is fixed to its respective stripper plate 73 by interengaging threads. Each needle unit has a compression spring 200, one end of which abuts a boss of stripper plate 70. Said boss is cylindrical and it fits slidably in the inner cylindrical wall of cylindrical head 69. Said compression spring 200 urges the stripper plate 73 away from needle plate 70, until pin 65 abuts the respective stop-end of slot 64, as shown in Fig. 32.

In this embodiment, each sleeve 63 has two rolls 66 which contact with the edge-cams 203a.

Each conveyor unit or means 150 and 150a has a respective lateral cam-shaft 152 or 152a which is mounted turnably in the frame of the machine. These cam-shafts 152 and 152a have respective two-lobed cams 153 and 153a fixed thereto.

An endless chain 154 meshes with a sprocket 175 which is fixed to cam-shaft 152 and with a sprocket 174 which is fixed to shaft 172. An endless chain 154a meshes with a sprocket 174a which is fixed to shaft 165 and with a sprocket 164 which is fixed to cam-shaft 152a.

The cam-shafts 152 and 152a are thus intermittently rotated in unison with the intermittent strokes of the conveyor means or units 150 and 150a.

The conveyor units 150 and 150a have respective horizontal, hollow, and longitudinally alined slide rods 156 and 156a, which are guided for horizontal to-and-fro movement on respective blocks 158 and 158a, which are fixed to the frame of the machine. Said slide rods 156 and 156a have respective cam-follower rolls 157 and 157a which are urged by respective compression springs 159 and 159a to abut the respective cams 153 and 153a. Said slide rods 156 and 156a have additional guide blocks at the proximate shafts 172 and 165.

This embodiment has an assembly and stripping station N, at which the two parts of the puff are assembled and stripped to fall into receptacle 160.

Each conveyor unit 150 and 150a has two loading stations M. The operator places a blank B into an outer die 33 at either said loading station M. The blank B is thus placed in the position shown in Fig. 6.

Each loaded outer die 33 is then moved to a cupping station at which the cup-die 23 is located, and each loaded outer die 33 is then moved to an adhesive-applying station, at which the adhesive is applied by hand or by the adhesive-applying means 24.

Each cup die 33 and each adhesive-applying mechanism 24 are moved up-and-down in unison while the respective conveyor units 150 and 150a are held stationary. The cup dies 33 and the adhesive-applying mechanisms 24 are thus moved up and down by hand, or by suitable cam means, which are sufficiently illustrated in the first embodiment.

Fig. 12 shows blade springs 82 which urge the needle plate 70 to move relative to die 33 in a direction parallel to the axis of rod 62. Similar springs can be fixed to the inner faces of needle plates 70 in the second embodiment, so that said springs will urge each needle plate 70 away from its block 33r. Thus, when a block 33r is in a top run of either conveyor unit 150 or 150a, said springs will urge needle plates upwardly relative to blocks 33r. The blocks 33r may be provided with suitable recesses to receive said springs, when a needle plate 70 abuts its respective block 33r. Also, the inner walls of dies 33 may be cylindrical and of uniform diameter inwardly of their blank-supporting shoulders, as previously noted.

The operation of his second embodiment is as follows:

At each of the loading stations M, the respective sleeve 63 is not latched to the respective rod 62, the respective pin 65 is at the top of the respective slot 64, the respective rolls 66 abut the respective edge-cams 203a, the respective needle plates 70 abut the respective blocks 33r, and the respective stripping plates 73 are in the positions illustrated in Fig. 6 relative to the respective needle plates 70. As previously noted, the second embodiment may have springs which urge the needle plates 70 to move away from blocks 33r, in a direction which is upward in the top runs of the conveyor units 150 and 150a. However, each needle plate 70 is fixed by its head 69 to its respective sleeve 63, whose rolls 66 abut the edge-cams 203a at the loading stations M, so that edge-cams 203a and rolls 66 hold each needle plate 70 against its block 33r at each loading station M.

The face-cams 202 are located and shaped to bear upon the latch springs 75, in order to urge latch heads 76 horizontally to enter recesses 74 of rods 62. However, the recesses 74 are located above latch heads 76 at loading stations M, so that latch heads 76 remain out of recesses 74 in non-operating positions at loading stations M. Also, the latching face-cams 202 may optionally be omitted at loading stations M.

Said latching face-cams 202 are provided at the cupping stations and may optionally be located anterior the cupping stations, between said cupping stations and the next preceding loading stations M.

Each cup-die 23 is operated to function as shown in Fig. 8, in order to locate and to shape the respective blank B as shown in Fig. 8, and also to depress the respective stripping plate 73 and its rigidly connected rod 62, until stripping plate 73 abuts its needle plate 70 as shown in Fig. 8. The recess 74 of rod 63 is thus depressed until it is alined with the respective latch head 76, and the face-cam 202 forces latch head 76 into recess 74, thus holding the respective stripping plate 73 against the respective needle plate 70, while the rolls 66 and edge-cams 203a hold each needle plate 70 against its block 33r.

The cup die 23 is then raised, and the respective conveyor units 150 and 150a are given their next stroke.

While each loaded die 33 is moved from the cupping station to the adhesive-applying station, the plate 38 is turned by hand or by a cam to move the heads 40a of the respective loaded die 33 inwardly as shown in Figs. 15 and 18, to bend the rim Ba inwardly as shown in Fig. 15; also, the needle plates 70 are moved upwardly relative to blocks 33r in unison with stripper plates 73 which are now held latched to sleeves 63 by face cams 202, to shape the blanks as shown in Fig. 12; the needle plates 70 are then moved down to abut blocks 33r, while the stripper plates 73 are also moved down to remain in contact with needle plates 70; and the heads 40a are then moved to their outer positions of Fig. 17.

Between the cupping station and the adhesive-applying station, the needle plates 70 are urged to move upwardly relative to blocks 33r by said springs, and the up-and-down movement of said needle plates 70 is controlled by the shape of edge-cams 203a, which are suitably shaped for this purpose with suitable peaks and depressions. This shape is well-known per se.

After the adhesive has been applied, the loaded dies and their needle units are moved to their horizontally alined positions at station N.

The edge-cams 203a have depressions at station N.

Figure 30:
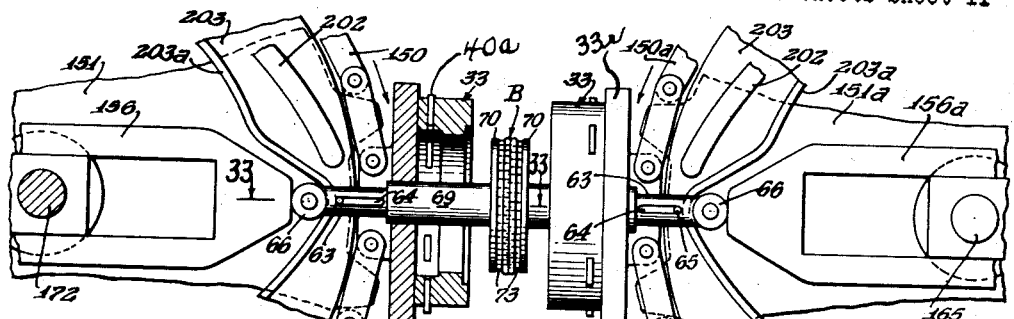
Fig. 30 is a detail of a part of Fig. 28, on a larger scale than in Fig. 28.

As the respective dies and their needle units are moved to their said horizontally alined positions, the slide rods 156 and 156a are moved towards each other by cams 153 and 153a to abut the respective rolls 66 and to push the needle units out of dies 33 towards each other, into the positions shown in Fig. 30. Each set of needles 71 then penetrates both blanks B, and the blanks B are pressed against each other. As the result of this pushing movement, the blade springs 75 at station N are pushed beyond points at which they abut the latching face-cams 202, so that each sleeve 63 is unlatched from its rod 62 at station N, at the time or shortly before the time that the needle units are moved into their positions of Figs. 30 and 33. In said positions, the rolls 66 may abut or be spaced slightly from the depressed parts of edge-cams 203a. The springs 200 now urge the stripper plates 73 towards each other and away from the needle plates 70, in order to exert pressure on the two halves of the puff. The springs 200 cannot force the needle plates 70 away from each other, because this is prevented by the contact of rolls 66 with the slide rods 156 and 156a.

The conveyor units 150 and 150a are held stationary during a sufficient period, so that the pressure of the needle plates 70 and of the stripper plates 73 firmly connects the blanks B at station N.

Figure 31:
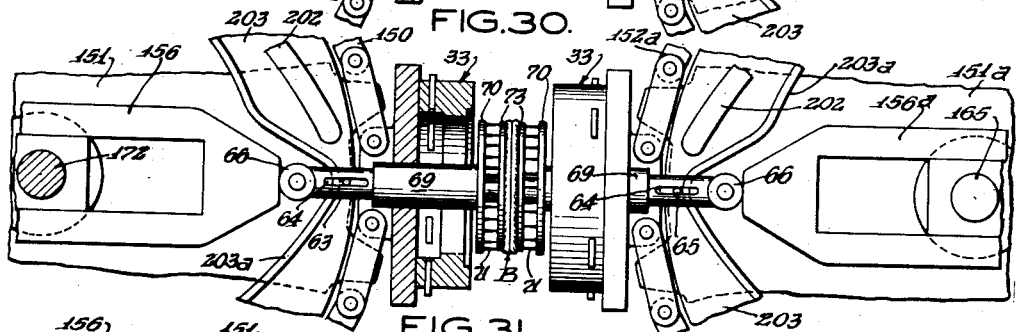
Fig. 31 illustrates the parts of Fig. 30, with the slide rods located slightly inwardly of their positions of Figs. 28 and 30. When said slide rods are thus moved inwardly, they are moved away from each other.

During the next strokes of the conveyor units 150 and 150a, the cams 153 and 153a are turned so that the compression springs 159 and 159a move the slide rods 156 and 156a away from each other in a retracting movement. Fig. 31 shows the partial retraction of slide rods 156 and 156a, and Fig. 32 shows the fully retracted positions of slide rods 156 and 156a.

As the slide rods 156 and 156a are retracted, the springs 200 maintain the stripper plates 73 pressed against the two halves of the puff, and the needle plates 70, whose rigidly connected sleeves 63 are now released from rods 62, are pushed away from each other by springs 200, to withdraw the needles 71 from the puff, as shown in Fig. 31.

Said respective strokes of the conveyor units 150 and 150a finally separate the stripping plates 73 from the finished puff, which falls into receptacle 160.

The latching face-cams 202 are interrupted between station N and the cupping stations, or between station N and a point between each cupping station and the next preceding loading station M.

The edge-cams 203a are shaped after station N to move the needle plates 70 inwardly into their dies 33, until said needle plates abut their respective blocks 33r.

We have disclosed preferred embodiments of our invention, but numerous changes and omissions and additions and substitutions can be made without departing from its scope.

Also, the invention covers the sub-combinations of the complete combinations or machines or devices disclosed herein.

We claim:

1. A method of making a powder puff which has one body-portion which has an inturned rim and another body-portion and an intermediate filler piece, which consists in impaling the blank of said first-mentioned body-portion upon a respective set of impaling needles which are located inwardly of the edge of said blank, thus providing the impaled part of said blank with an edge-portion which is free from said needles, turning said edge-portion inwardly and impaling it on said needles to provide said blank with an inturned rim which has an inner edge, applying adhesive to the exposed surface of said rim, locating said filler piece between said blank and said other body-portion with the edge of said filler piece located between the doubled edge of said blank and the inner edge of said rim, and connecting said body-portions by said adhesive, said adhesive being confined to a part of said rim which is spaced from the edge of said filler piece.

2. A needle unit which comprises a tube which has a longitudinal axis, a needle plate fixed to said tube, said needle plate having a row of needles which are parallel to said axis, a rod axially slidable in said tube, a stripper plate fixed to said rod, said stripper plate having holes therein for receiving said needles, said stripper plate being movable in unison with said rod to a position in which said stripper plate substantially abuts said needle plate, said stripper plate being movable in unison with said rod to another position in which said stripper plate clears said needles.

3. A needle unit according to claim 2, in which said stripper plate has an edge-portion which is raised axially relative to the body of said stripper plate.

4. A needle unit according to claim 2, in which said tube has a lateral opening therein, said rod has a lateral recess which can be laterally alined with said opening, and said tube has an external latch connected thereto, said latch having a head which is adapted to be inserted through said opening to said tube into said recess of said rod to hold the rod in fixed axial position relative to said tube.

5. In combination, a hollow outer die which has a longitudinal axis, said outer die having an axial opening, the internal wall of said opening being shaped to provide an internal shoulder adjacent the top of said die, an outer turnable plate mounted upon the external wall of said die, said outer plate being turnable relative to said die about the axis of said die, said turnable plate having a series of radial lugs which are external to said die, cam members turnably connected to said lugs, said die also having a series of radially slidable plates, each said plate having a cam slot in which a respective cam member is located, guide means for guiding said radially slidable plates to move radially relative to said die, said radially slidable plates having internal end parts which are located in said opening of said die, said cam slots being shaped so that the turning of said outer turnable plate relative to said die radially actuates said radially slidable plates.

6. A combination according to claim 5, in which said inner end parts are shaped to abut each other and to form a closed ring when said slidable plates are in their radially innermost positions.

7. A combination according to claim 5, in which said turnable plate is spring-biased to a normal position in which said inner end parts are spaced from each other.

8. A combination according to claim 5, in which one of said lugs is of greater radial length than the other lugs, said longest lug having an additional cam member connected thereto.

9. A combination according to claim 5, in which said inner end parts have needle-receiving holes, said combination also having a needle unit associated with said die, said needle unit comprising a tube to which a needle plate is fixed, said tube having a longitudinal axis, said needle plate having axially disposed needles which extend into the opening of said die, a rod which is axially slidable in said tube, said rod having a stripper plate fixed thereto, said stripper plate having needle-receiving holes, means for maintaining said needle plate in fixed position relative to said die.

10. A machine for assembling two pieces of material comprising two endless conveyors, said conveyors having proximate ends which are separated from each other to provide an assembly station, each said conveyor having at least one holder fixed thereto, said conveyors being movable to locate said holders in alinement at said assembly station, each said holder being adapted to hold a respective blank, each said holder having a needle unit provided with needles on which the respective blank can be impaled, each said needle unit also having a stripper plate which is movable relative to the needles of said unit, cam operated means at said assembly station adapted first to project said needle units and said stripper plates in unison towards each other to impale said blanks on the needles of both needle units while clamping said blanks between said stripper plates, said cam means being operative first to withdraw the needle units from said blanks and then to remove said stripper plates from contact with the assembled blanks.

11. A method of shaping a piece of material from a blank of said material, which consists in piercing the body of said blank at a plurality of body-piercing points which are located inwardly of the edge of said body in order to provide an edge-portion of said body which is free from said body-piercing points, supporting said body at said body piercing points, then turning said edge portion inwardly relative to said body, and then moving said inwardly turned edge-portion towards said body while piercing said edge-portion at additional piercing points which are alined with said body-piercing points, and supporting said inwardly turned edge-portion at said additional piercing points.

12. A method of shaping a disc-shaped blank of material which consists in piercing a body of said blank at a plurality of piercing points which are located inwardly of the edge of said blank, thus providing said pierced body-portion of the blank with an edge-portion which is free from said piercing points, supporting said blank at said piercing points, bending said edge-portion into frusto-conical outwardly-flaring shape relative to said pierced and supported part, then bending said edge-portion inwardly to overlie said pierced and supported part, and then moving said edge-portion towards said body, while piercing said edge-portion at additional piercing points which are alined with said previously mentioned piercing points, said alined piercing points being located inwardly of the common marginal junction-line of said inwardly turned edge-portion and said body of the blank.

13. A method of making a powder puff which has one body-portion which has an inturned rim and which also has another body-portion and an intermediate filler piece, which consists in piercing the blank of said first mentioned body-portion at a respective series of piercing points which are located inwardly of the edge of said blank, supporting said blank at said piercing points, turning said edge portion inwardly and piercing it at additional piercing points which are alined with said first mentioned piercing points in order to provide said blank with an inturned rim which has an inner edge, applying adhesive to the exposed outer surface of said rim, locating said filler piece between said pierced blank and said other body-portion with the edge of said filler piece located intermediate the doubled edge of said blank and the inner edge of said rim, and connecting said body-portions to each other by said adhesive.

14. A method according to claim 13, in which the adhesive is confined to a part of said rim which is spaced from the edge of said filler piece.

15. A method according to claim 13 in which the second mentioned body-portion is pierced and supported at another set of piercing points before it is applied to said first mentioned body-portion.

16. A method of shaping an original blank of material to provide a shaped blank, said shaped blank having a body-portion and an edge-portion, said edge-portion of said shaped blank being laterally inwardly folded relative to said body-portion of said shaped blank at a junction fold-line of said body-portion and said edge-portion of said shaped blank, said laterally inwardly folded edge-portion of said shaped blank overlying said body-portion of said shaped blank, which consists in holding said original blank in a holding zone of said original blank, said holding zone having an edge-line, said edge-line of said holding zone being spaced laterally inwardly of the edge of said original blank and being also spaced laterally inwardly of said junction fold-line, laterally inwardly folding a fold-portion of said original blank at said junction fold-line to provide said edge-portion, said fold-portion of said original blank being located intermediate the edge of said original blank and said junction fold-line, said fold-portion of said original blank being laterally inwardly folded along said junction fold-line until said fold-portion of said original blank overlies said body-portion of said original blank, and temporarily holding said fold portion in its said laterally inwardly folded position, said holding zone and said fold-portion being held at alined piercing points thereof.

FELIX LEVY-HAWES.
MAURICE CASTEL.

References Cited in the file of this patent

UNITED STATES PATENTS

| Number | Name | Date |
| --- | --- | --- |
| 2,110,907 | Friedberg | Mar. 15, 1938 |
| 2,159,227 | Reiffert | May 23, 1939 |
| 2,367,490 | Ducklo | Jan. 16, 1945 |
| 2,382,004 | Curran | Aug. 14, 1945 |
| 2,466,643 | Magid | Apr. 5, 1949 |
| 2,484,336 | Epstein | Oct. 11, 1949 |